UNITED STATES PATENT OFFICE.

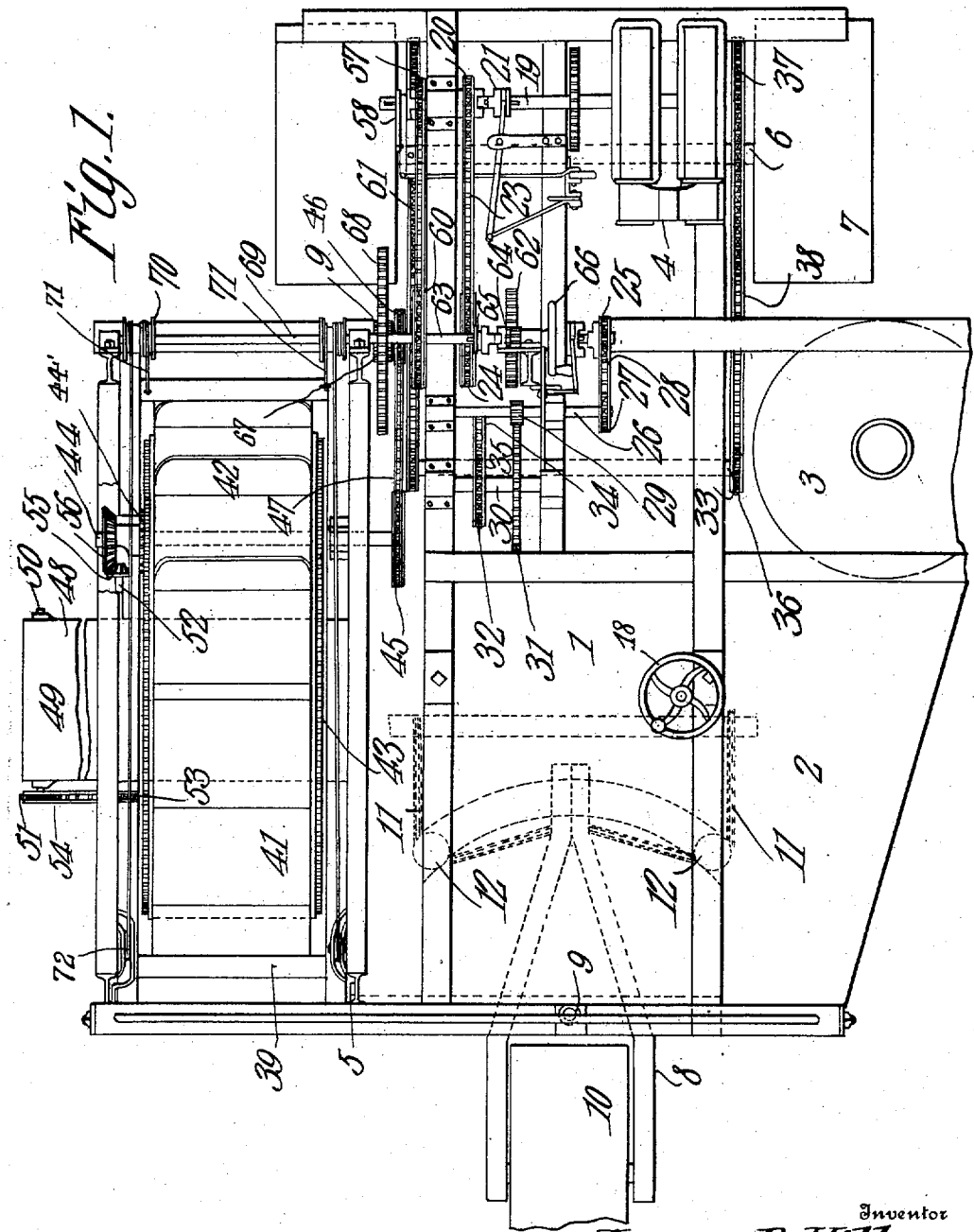

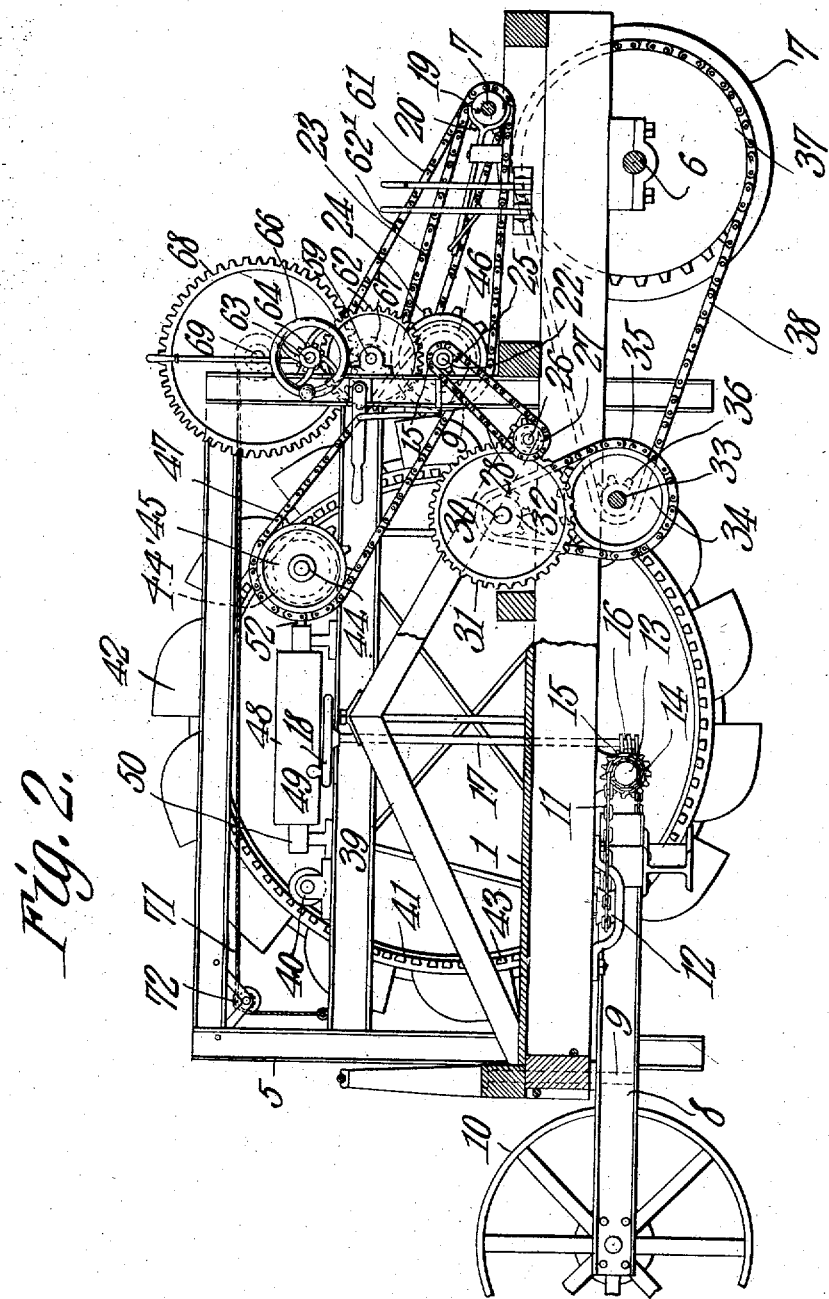

JAMES B. HILL, OF FINDLAY, OHIO.

DIGGING-MACHINE.

No. 885,343.  Specification of Letters Patent.  Patented April 21, 1908.

Application filed September 4, 1907. Serial No. 391,288.

*To all whom it may concern:*

Be it known that I, JAMES B. HILL, a citizen of the United States, residing at Findlay, in the county of Hancock and State of Ohio, have invented a new and useful Digging-Machine, of which the following is a specification.

This invention has relation to digging machines and it consists in the novel construction and arrangement of its parts as hereinafter shown and described.

The object of the invention is to provide a machine of the character indicated, the parts of which are so arranged that the machine may be conveniently and accurately operated and easily handled.

A special feature of the invention is that the parts are so arranged upon the frame of the machine as to counter balance each other upon the supporting wheels, whereby the machine will have no tendency to tilt to one side or the other and at the same time the parts will be in compact arrangement.

In the accompanying drawing:—Figure 1 is a top plan view of the digging machine with part broken away. Fig. 2 is a longitudinal sectional view of the digging machine.

The machine consists of the platform 1 which is provided at one side with a laterally disposed wing 2. The boiler 3 is mounted upon the wing 2 and the engine 4 is mounted upon the platform 1. The platform 1 is provided at its side opposite the wing 2 with a frame 5. The forward end of the platform 1 is mounted upon an axle 6 which in turn is supported by the traction wheels 7 which are located beyond the opposite sides of the said platform. The frame 8 is pivoted to the rear end of the platform 1 at the point 9 which is located on a line midway between the wheel 7. The frame 8 is arranged to swing in a plane parallel with the platform 1. The wheel 10 is journaled in the frame 8 and supports the rear end of the platform 1. The chains 11 are attached to the forward end of the frame 8 and pass around pulleys 12 located under the platform 1 and at opposite sides of the frame 8. The said chains are reversely wound upon the drums 13 which are mounted upon the shaft 14. The worm wheel 15 is attached to the shaft 14 and the worm 16 meshes with the said worm wheel. The worm 16 is mounted upon the shaft 17 which is journaled to the platform 1 and is vertically disposed and which is provided at its upper end with a hand wheel 18. The frame 8 is swung upon its pivot through the instrumentality of the chains 11, drums 13, shaft 14 and the shaft 17 and their connections, whereby means is provided for steering the digging machine.

The engine 4 is operatively connected with the crank shaft 19 which is located at the forward portion of the frame 1. The sprocket wheel 20 is loosely mounted upon the shaft 19 and is adapted to be engaged by the clutch member 21 also mounted upon the said shaft. The shaft 22 is journaled for rotation upon superstructure provided upon the platform 1. The sprocket chain 23 passes around the sprocket wheel 24 mounted upon the shaft 22 and the sprocket wheel 20 on the shaft 19. The sprocket wheel 25 is located upon the shaft 22. The shaft 26 is journaled for rotation upon the platform 1 and is provided with a sprocket wheel 27. The sprocket chain 28 passes around the sprocket wheel 25 and 27. The gear wheel 29 is mounted upon the shaft 26. The shaft 30 is journaled for rotation upon the superstructure of the platform 1 and is provided with a gear wheel 31 which meshes with the gear wheel 29. The sprocket wheel 32 is mounted upon the shaft 30. The shaft 33 is journaled for rotation under the platform 1. The sprocket wheel 34 is mounted upon the shaft 33. The sprocket chain 35 passes around the sprocket wheels 32 and 34. The sprocket wheels 36 are fixed to the end portions of the shaft 33. The sprocket wheels 37 are mounted upon the axle 6 and are arranged to rotate with the traction wheels 7. The sprocket chains 38 pass around the sprocket wheels 36 and 37.

When the clutch 21 is moved into engagement with the sprocket wheel 20 rotary movement is transmitted from the shaft 19 through the intermediate parts above enumerated to the traction wheels 7. By varying the relative sizes of the gear wheels 29 and 31 the machine may be made to travel at a fast or slow speed as desired. The frame 39 is arranged to move vertically within the frame 5 and is provided with wheels 40 which support the circular rotary digger 41. Said digger is provided upon its periphery with the buckets 42 which are adapted to cut the earth at the lower side of the digger and elevate the same to the upper side thereof. The rim of the digger 41 is provided with the gear teeth 43. The shaft 44 is journaled upon the frame 39 and passes transversely through the digger 41 and is provided with gear wheels 44' which mesh with the gear teeth 43. The sprocket wheel 45 is fixed to the shaft 44 and a sprocket wheel 46 is fixed to the shaft 22. The sprocket chain 47 passes around the sprocket wheel 45 and 46. Thus rotary movement is transmitted from the shaft 22 to the digger 41. The conveyer 48 is mounted upon the frame 39 and passes transversely through the digger 41. Said conveyer consists of an endless belt 49 which passes around the shafts 50. The outer shaft 50 is provided with a sprocket wheel 51 and the shaft 52 is journaled for rotation upon the frame 39 and passes transversely through the conveyer 48. The shaft 52 is provided with a sprocket wheel 53 and the sprocket chain 54 passes around the sprocket wheels 51 and 53. The beveled pinion 55 is fixed to the shaft 52 and meshes with a beveled gear wheel 56 mounted upon the shaft 44. Thus movement is transmitted from the shaft 44 to the conveyer 48. The sprocket wheel 57 is loosely mounted upon the shaft 19 and the clutch member 58 is mounted upon the shaft 19 and is adapted to engage and disengage the sprocket wheel 57. The shaft 59 is journaled for rotation upon the superstructure of the platform 1 and the sprocket wheel 60 is mounted upon the shaft 59. The sprocket chain 61 passes around the sprocket wheels 60 and 57. The gear wheel 62 is mounted upon the shaft 59.

The shaft 63 is journaled for rotation upon the superstructure of the platform 1, at a point above the shaft 59. The gear wheel 64 is loosely mounted upon the shaft 63 and the clutch member 65 is located upon the shaft 63 and is adapted to engage the hub of gear wheel 64 whereby the said sprocket wheel is fixed with relation to the shaft 63. The shaft 63 is provided with a hand wheel 66, and the gear wheel 64 meshes with the gear wheel 62. The shaft 59 is provided with a pinion 67 which meshes with a gear wheel 68 mounted upon the shaft 69 journaled in the upper portion of the frame 5. The said shaft 69 extends transversely across the frame 5 and is provided with the drums 70 upon which the tackles 71 wind. The said tackles connect with the corner portions of the frame 39 and two of them pass over the pulleys 72 located at the rear portion of the frame 5 and the said tackles operate as means for raising and lowering the frame 39 which correspondingly moves the digger 41. Through the train of gear wheels above described, it will be seen that rotary movement is transmitted to the shaft 69 from the shaft 19 when the clutch 58 is moved into engagement with the sprocket wheel 57. Also, when the clutch 58 is out of engagement with the sprocket wheel 57 the clutch 65 may be moved into engagement with the gear wheel 64 when the shaft 69 may be turned by turning the hand wheel 66 manually. Thus a power means is provided for raising and lowering the digger as well as a manual operated means. The last said means is used when it is desired to cut an excavation accurately and to a nicety.

Having described my invention what I claim as new and desire to secure by Letters-Patent is:—

1. A machine of the character described comprising a platform, wheels supporting the same, an engine mounted on the platform, a digger located at one of the lateral sides of the platform and a boiler located at the opposite lateral side of the platform, said boiler and digger counterbalancing the platform upon the supporting wheels.

2. A machine of the character described comprising a platform, a pair of traction wheels supporting the forward end thereof, a single dirigible wheel supporting the rear end thereof, a digger located at one of the lateral sides of the platform, a boiler located at the opposite side of the platform, an engine mounted upon the platform, and means for operatively connecting the engine with the traction wheels and digger, which means is located between the boiler and digger.

In testimony that I claim the foregoing as my own, I have hereto affixed my signature in the presence of two witnesses.

JAMES B. HILL.

Witnesses:
   LULU MONTGOMERY,
   C. B. DIERGGINS.